Patented Sept. 19, 1950

2,522,641

UNITED STATES PATENT OFFICE 2,522,641

ALUMINUM SALT COMPOSITION AND PROCESS FOR PRODUCING SAME

Louis Schmerling, Riverside, Ill., assignor to Universal Oil Products Company, Chicago, Ill., a corporation of Delaware No Drawing. Application December 3, 1948, Serial No. 63,443

10 Claims. (Cl. 260—448)

This invention relates to certain novel aluminum salt complexes containing inorganic and organic acid radicals which have been found useful in catalyzing certain organic reactions, particularly hydrocarbon conversion reactions, in which a catalyst having a somewhat milder catalyzing activity than the unmodified aluminum halide is advantageous in effecting a particular conversion desired. More specifically, the invention concerns modified aluminum halide catalysts and methods for their preparation, the present aluminum salt complexes containing aluminum bound to one or more alkanoic acid radicals.

The aluminum halides of the middle halogens, that is, aluminum chloride and aluminum bromide, are known for their catalytic activity in promoting a wide variety of organic chemical reactions. These aluminum halide catalysts, however, because of their pronounced activity in promoting condensation reactions between certain organic reactants, often form sludge complexes with the reactants, especially reactants which contain a highly reactive group or one which readily cleaved from the major portion of the molecule in the presence of an aluminum halide and at the reaction conditions utilized. In many instances in which the unmodified aluminum halide catalyst is utilized, extensive side reactions may occur or the reactants may polymerize or condense into high molecular weight tarry materials. Because of these undesirable characteristics of the aluminum halide catalysts, the processes in which they are employed are generally characterized by relatively high catalyst losses and relatively low efficiencies.

One object of the present invention is to modify the activity of aluminum halide catalysts thereby to overcome substantially the aforementioned disadvantages. Another object of this invention is to provide a modified aluminum halide catalyst which may be separated from the products of the reaction and utilized in a subsequent reaction without further treatment or regeneration thereof.

Broadly, the invention comprises an improvement in the catalysis of organic chemical reactions of the type which can be catalyzed by an aluminum halide catalyst, said improvement residing in the use of a modified aluminum halide catalyst prepared by the reaction of aluminum chloride or aluminum bromide with an aluminum salt of an organic acid.

In one of its more specific embodiments, the invention concerns a novel composition of matter formed by reacting equimolecular proportions of an aluminum halide of a middle halogen with an aluminum salt of an organic acid having a dissociation constant greater than $1 \times 10^{-3}$. One specific example of the compositions herein provided is that formed by reacting equimolecular proportions of aluminum chloride with basic aluminum acetate.

The formation of a modified aluminum halide catalyst and the novel compositions of matter comprising the present invention is believed to proceed in accordance with the following type equation, representing the reactants in the form of their empirical formulas:

wherein R represents the alkyl group of an alkanoic acid having a dissociation constant less than $1 \times 10^{-3}$ and X represents a middle halogen: chlorine and bromide. By selecting different acids of the generally broad group of known alkanoic acids having a dissociation constant less than $1 \times 10^{-3}$, which when reacted with aluminum oxide form the basic aluminum acid salt reactants represented by the above empirical formula, and upon reacting the same with aluminum chloride and/or aluminum bromide, a relatively large number of individual catalyst compositions may be provided by the present process. A typical catalyst composition provided by the present process, formed by the reaction of aluminum chloride and more basic aluminum acetate has the following empirical formula:

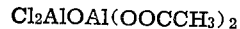

Of the basic aluminum acid compounds utilizable herein, basic aluminum formate and basic aluminum acetate are preferred, because of their relative cheapness and the ease of their preparation. However, higher alkanoic acids of the fatty acid series, such as propionic acid, butyric acid, hexanoic acid, etc. which form the corresponding basic aluminum acid salts thereof by reaction with an aluminum oxide or hydroxide, may similarly be employed in the process. Aluminum chloride is necessarily the least expensive of the anhydrous aluminum halides utilizable herein, although aluminum bromide, as well as mixtures thereof with aluminum chloride, form catalytic composites containing bromine radicals which are utilizable for catalytic purposes and are contemplated as one of the novel compositions herein provided. Since a variety of reactants having various molecular weights may be employed in the process, it is to be expected that such products, while they all have catalytic activity in various conversion reactions, are not necessarily equivalent in their catalytic effectiveness. The activity of the composites in catalyzing such reactions as the isomerization of normal paraffins to isoparaffins, alkylation of isoparaffins and aromatics with olefinic hydrocarbons and their derivatives, and the polymerization of various organic reactants including the olefins and diolefins is usually dependent upon the molecular weight of the alkanoic acid forming the basic aluminum acid reactants in the process. Thus, in general, the activity of the composite decreases as the proportion of organic acid radical in the composite increases; that is, as the proportion of aluminum dihalide radical decreases in the composite. For this reason, the composites prepared from the basic aluminum acid salts of the lower alkanoic acid series usually possess generally higher activities than the composites prepared from the basic aluminum acid salts of alkanoic acids of higher molecular weight.

The products of the present process are also useful in effecting various organic condensation reactions, such as the reaction of aromatic hydrocarbons with olefins, such as propene and isobutylene, and with alkyl halides, such as the tertiary alkyl halides, the condensation of aromatic compounds with acid halides, the reaction of aldehydes and ketones with various amines to form resinous condensation products, and other reactions of this nature and these reactions are not generally accompanied by discoloration of the reaction product, as in the case of utilizing the unmodified aluminum halide catalyst.

The catalystic composites of this invention are prepared by reacting equimolecular proportions of a basic aluminum acid salt with an anhydrous aluminum halide selected from the group consisting of aluminum chloride and aluminum bromide, at a temperature of from about 100° up to about 200° C., or the sublimation point of the aluminum halide reactant. The reaction is accompanied by the evolution of hydrogen halide from the reaction mixture, and generally, the reaction is allowed to continue until the evolution of approximately one molecular proportion of hydrogen halide therefrom. In order to control the rate of reaction and to maintain the evolution of hydrogen halide within controlled limits, the reaction may be effected in the presence of a suitable inert solvent, such as a halogenated saturated hydrocarbon or a solvent such as a nitroparaffin. The reaction product consists of a friable granular product which is soluble in water and which may be utilized as such or shaped into the form of granules, pellets or in variously shaped extruded forms as well as in a powdered or finely divided condition. The catalyst composite, for example, may be pilled into the form of granules and utilized as such in a stationary bed type of operation in which the catalyst particles are contained in a reaction chamber and the reactants, in liquid or varpor phase, passed over or through the catalyst at suitable temperatures, pressures, and rates of flow. In another type of operation, the catalyst as a finely divided powder may be suspended in a stationary mass of the liquid reactants undergoing conversion or maintained in a so-called "fluidized" condition in which the stream of reactants as a vapor or a liquid is passed through a mass of the finely divided catalyst at a relatively high velocity and at the desired reaction conditions to maintain the catalyst particles dispersed throughout the stream of reactants. The present composite may also be deposited upon or admixed with various inert carriers such as alumina, silica, activated carbon, various silicate clays, etc., as an intimate mixture therewith or deposited on the surface of particles of such inert carriers.

The following data are introduced for illustrative purposes to indicate the method of manufacturing the present catalyst composite and to illustrate the character of the results obtainable from a typical reaction process in which the catalyst is utilized to effect the particular condensation reaction. In thus specifying a typical catalyst and use thereof, it is not intended to thereby restrict the scope of the present invention in strict accordance with the particular data presented below.

A catalyst composite of the type herein provided was prepared by interaction of equimolecular proportions of basic aluminum acetate and anhydrous aluminum chloride at a temperature of from about 140° to about 180° C. The reaction mixture containing the above components was heated for 2 hours at said temperature, the reaction being accompanied by the evolution of one molecular proportion of hydrogen chloride therefrom. Only a very slight trace of aluminum chloride sublimed from the reaction mixture upon heating the latter to a temperature of approximately 200° C., thus indicating substantially complete combination of the aluminum halide reactant charged to the reaction mixture. The reaction mixture upon cooling consisted of a white friable solid which was soluble in water.

The grams of the modified aluminum chloride catalysts prepared as in the above reaction procedure was added to a mixture of 1.0 mole of benzene and 0.5 mole of tertiary butyl chloride. The reaction mixture, was then heated under a reflux column to a temperature of from about 60° to about 80° C. during which hydrogen chloride was evolved from the reaction mixture. Following completion of the reaction, marked by the discontinuance in the liberation of hydrogen chloride from the reaction mixture, no viscous liquid lower layer was formed as is usually obtained when pure anhydrous aluminum chloride is utilized to catalyze a similar reaction mixture. The product, which resulted from a substantially quantitative conversion of the tertiary butyl chloride, contained mono-tertiary butylbenzene and para-di-tertiary butylbenzene. The catalyst composite was recoverable from the reaction mixture in substantially its original granular condition.

I claim as my invention:

1. A composition of matter consisting of the reaction product of an aluminum halide selected from the group consisting of aluminum bromide and aluminum chloride and a basic aluminum acid salt of a carboxylic acid having a dissociation constant less than $1 \times 10^{-3}$, said composition having the empirical formula:

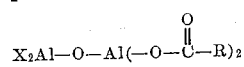

in which R is an alkyl group and X is a halogen atom selected from the group consisting of chlorine and bromine.

2. A process for the preparation of a catalyst which comprises reacting at a temperature of from about 100° to 200° C. equi-molar proportions of an aluminum halide selected from the group consisting of aluminum bromide and aluminum chloride with a monobasic aluminum acid salt of an alkanoic acid having a dissociation constant of less than $1 \times 10^{-3}$.

3. A process for the preparation of a catalyst which comprises reacting equimolecular proportions of an anhydrous aluminum halide selected from the group consisting of aluminum bromide and aluminum chloride with a monobasic aluminum acid salt of an alkanoic acid have a dissociation constant of less than $1 \times 10^{-3}$ at a temperature of from about 100° to about 200° C. for a time sufficient to liberate approximately one molar proportion of hydrogen halide from said reaction.

4. A process for the preparation of a catalyst which comprises reacting equimolecular proportions of anhydrous aluminum chloride with a monobasic aluminum acid salt of an alkanoic acid having a dissociation constant less than $1 \times 10^{-3}$ for a time sufficient to liberate approximately one molecular proportion of hydrogen chloride from the reaction mixture.

5. A process for the preparation of a catalyst which comprises reacting equimolecular proportions of an aluminum halide selected from the group consisting of aluminum bromide and aluminum chloride with monobasic aluminum acetate for a time sufficient to liberate one molecular proportion of hydrogen halide.

6. A process for the preparation of a catalyst which comprises reacting equimolecular proportions of an anhydrous aluminum halide selected from the group consisting of aluminum bromide and aluminum chloride with monobasic aluminum formate for a time sufficient to liberate one molecular proportion of hydrogen halide from the reaction mixture.

7. A composition of matter:

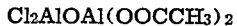

8. A compound of the formula:

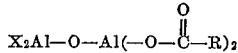

in which R is an alkyl group and X is a halogen atom selected from the group consisting of chlorine and bromine.

9. A process for the preparation of a catalyst which comprises reacting at a temperature of from about 100° to about 200° C. equi-molar proportions of an aluminum halide selected from the group consisting of aluminum bromide and aluminum chloride with a monobasic aluminum acid salt of a saturated fatty acid having a dissociation constant of less than $1 \times 10^{-3}$.

10. A process for the preparation of a catalyst which comprises reacting at a temperature of from about 100° to about 200° C. equi-molar proportions of an aluminum halide selected from the group consisting of aluminum bromide and aluminum chloride with a monobasic aluminum acid salt of a saturated fatty acid selected from the group consisting of formic, acetic, propionic, butyric and hexanoic acids.

LOUIS SCHMERLING.

REFERENCES CITED

The following references are of record in the file of this patent:

FOREIGN PATENTS

| Number | Country | Date |
|---|---|---|
| 94,851 | Germany | Oct. 30, 1897 |

OTHER REFERENCES

Krantz et al., "Chem. Abstracts," vol. 39 (1945), col. 982[1].

Benrath et al., "Jour. prakt. Chemie," 2nd ser., vol. 72 (1905), pp. 232–235.

Funk et al., "Zeit. anorg. Chem.," vol. 199 (1931), pp. 93–96.